United States Patent [19]
Tsujimoto et al.

[11] Patent Number: 4,878,124
[45] Date of Patent: Oct. 31, 1989

[54] IMAGE INCLINATION DETECTING METHOD AND APPARATUS

[75] Inventors: Shuichi Tsujimoto; Haruo Asada, both of Yokohama, Japan

[73] Assignee: Kabushiki Kaisha Toshiba, Kawasaki, Japan

[21] Appl. No.: 227,119

[22] Filed: Aug. 2, 1988

[30] Foreign Application Priority Data

Sep. 25, 1987 [JP] Japan ................. 62-241414

[51] Int. Cl.$^4$ ............................................. H04N 1/40
[52] U.S. Cl. ................................... 358/443; 358/261.1
[58] Field of Search ............ 358/280, 285, 282, 261.1; 382/61

[56] References Cited

U.S. PATENT DOCUMENTS

| | | | |
|---|---|---|---|
| 3,553,437 | 1/1971 | Wilson | 382/61 |
| 4,513,390 | 4/1985 | Walter | 358/102 |
| 4,533,959 | 8/1985 | Sakurai | 358/280 |
| 4,633,507 | 12/1986 | Cannistra | 382/61 |
| 4,672,461 | 6/1987 | Yoshida | 358/282 |
| 4,723,297 | 2/1988 | Postl | 358/285 |
| 4,736,443 | 4/1988 | Miyagawa | 382/61 |
| 4,748,678 | 5/1988 | Takeda | 382/61 |

OTHER PUBLICATIONS

Masuda et al., "Approach to Smart Document Reader System," IEEE Workshop Capami, 1985, pp. 550–557.

Primary Examiner—Edward L. Coles, Sr.
Assistant Examiner—Jerome Grant
Attorney, Agent, or Firm—Foley & Lardner, Schwartz, Jeffery, Schwaab, Mack, Blumenthal & Evans

[57] ABSTRACT

A image inclination detecting method and an apparatus achieving the method calculate distances between leading edges or between trailing edges of runs (consecutive white or black pixels) that are located on adjacent two scanning lines respectively. From occurrence frequencies of these edge distances, a representative value that may indicate an inclination of the image most clearly is found, and, based on the representative value, the inclination of the image is computed.

20 Claims, 6 Drawing Sheets

FIG. 4

| FLAG | RUN LENGTH |

0/1 = WHITE / BLACK

FIG. 5a

| 08 | 13 | 09 | 12 | 04 | 13 | 07 | 15 |

FIG. 5b

| 8 | 11 | 20 | 22 | 26 | 29 | 36 | 41 |

FIG. 6a

| 8 | 11 | 20 | 22 | 26 | 29 | 36 | 41 |

FIG. 6b

| 1 | 0 | 1 | 0 | 0 | 0 | 1 | 0 |

IMAGE INCLINATION DETECTING METHOD AND APPARATUS

BACKGROUND OF THE INVENTION

1. Field of the Invention

The present invention relates to a method and an apparatus for detecting the inclination of image data read by an optical character reader of a character recognition system or a computer graphics system.

2. Description of the Prior Art

FIG. 1 is a view showing an example of picking up character regions according to a character recognition technique. In the figure, a document 1 has image data. The document 1 is scanned by a scanner, and the number of black dots of the image data are accumulated in a lateral direction (parallel to a scanning direction) as well as in a longitudinal direction (perpendicular to the scanning direction) to obtain a distribution (distribution projection) 2 of the black dots. Based on the distribution 2, horizontal and vertical positions of the individual character regions are estimated to determine regions to pick up.

According to this technique, the individual character regions may correctly be picked up only when the document 1 is correctly positioned with respect to the scanning direction of the scanner as shown in FIG. 1, because the distribution may present steep changes and clearly show the character regions only with such a correct positioning.

If the document 1 is obliquely positioned with respect to the scanning direction of the scanner as shown in FIG. 2, the distribution projection does not correctly reflect the character regions so that the character regions may not be picked up correctly. It is necessary, therefore, to detect and correct the inclination of the image before picking up the character regions.

As a method for detecting the inclination of an image, it has been proposed to put reference marks on a document or use edges of the document and measure a time difference of the marks or the edges when they pass the scanner. However, this method is unable to detect the inclination of characters that are oblique with respect to the document.

There is another method for detecting the inclination. This method obtains distribution projections in plural directions of an input image in detecting the inclination of the image. However, this method requires many computations to determine the inclination, thus a long processing time.

SUMMARY OF THE INVENTION

An object of the present invention is to provide a method and an apparatus capable of detecting at a high speed the inclination of an image.

From a statistical analysis, it is known that characters are largely constituted by horizontal and vertical segments. Particularly, straight lines, such as rules of tables, mostly comprise the horizontal and vertical segments. It is observed, in addition, that characters printed on a document sheet have a certain orientation as a whole.

When characters are oblique with respect to a scanning direction, positions of edges of the characters will shift for every scan by a fixed distance corresponding to an inclination of the characters.

The image inclination detecting method of the present invention utilizes the statistical nature of characters that they are largely constituted by horizontal and vertical segments as well as utilizing the dislocation between the segments of the characters in adjacent scanning lines, in computing the inclination.

The image inclination detecting method of the present invention calculates distances between leading edges or between trailing edges of runs (consecutive white or black pixels) that are located on adjacent two scanning lines respectively. From occurrence frequencies of these edge distances, a representative value that may indicate an inclination of the image most clearly is found, and, based on the representative value, the inclination of the image is computed.

According to the image inclination detecting method of the present invention, image data are converted into run length codes from which an inclination of the image is directly obtained. Therefore, it is not required to store the image as binary data in a memory to compute the inclination of the image so that only a small capacity is required for the memory.

In addition, the image inclination detecting method of the present invention can compute the inclination in a short time compared to the conventional method in which the inclination is calculated according to a distribution projection. Therefore, the method of the present invention realizes a practical processing speed in software processing.

The image inclination detecting apparatus of the present invention embodies the method of the present invention and detects the inclination of an image at a high speed.

These and other objects, features and advantages of the present invention will be more apparent from the following detailed description of a preferred embodiment in conjunction with the accompanying drawings.

BRIEF DESCRIPTION OF THE DRAWINGS

FIG. 4 is an explanatory view showing a run length code;

FIG. 5 (a) is a view showing run length codes of image data read through scanning;

FIG. 5 (b) is a view showing edge coordinates converted from the run length codes of FIG. 5 (a);

FIG. 6 (a) is a view showing edge coordinates counted from the beginning of a scan;

FIG. 6 (b) is a view showing flags set according to edge distances of the coordinates of FIG. 6 (a);

FIG. 7 (b) is a view showing runs on a scanning line, where white runs shorter than a predetermined length have been replaced with black runs to leave long white runs;

FIG. 12 (b) is a histogram of edge distances smoothed with a Gaussian operator.

DETAILED DESCRIPTION OF THE PREFERRED EMBODIMENTS

Figure 1:
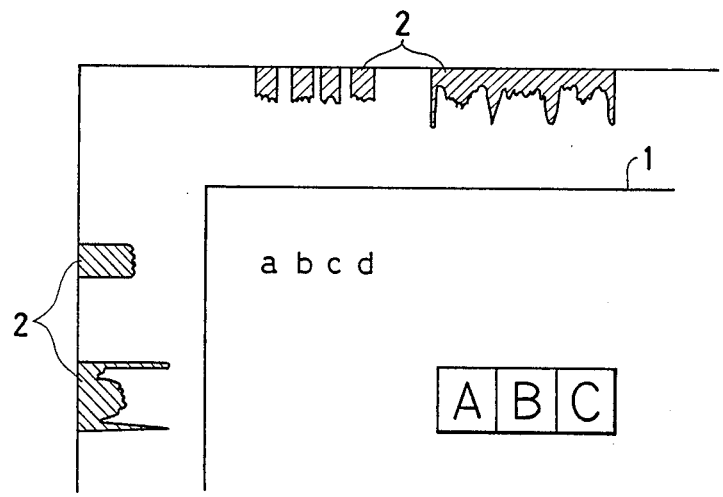
FIG. 1 is a view showing a distribution projection with an image not inclined.
Figure 2:
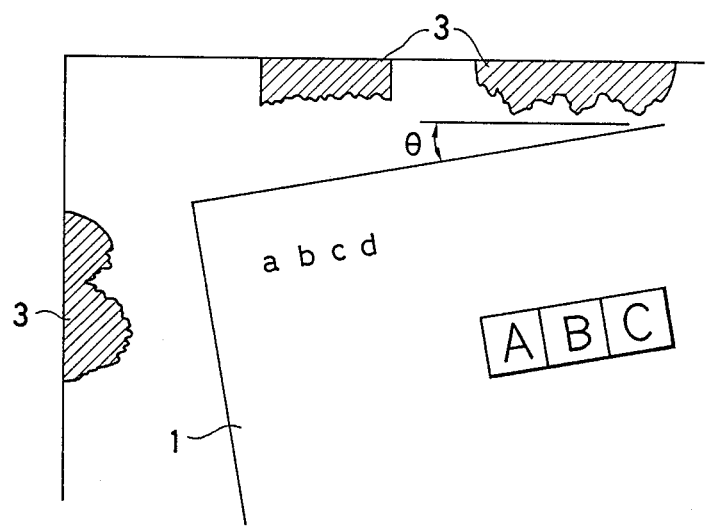
FIG. 2 is a view showing a distribution projection with an image inclined.
Figure 3:
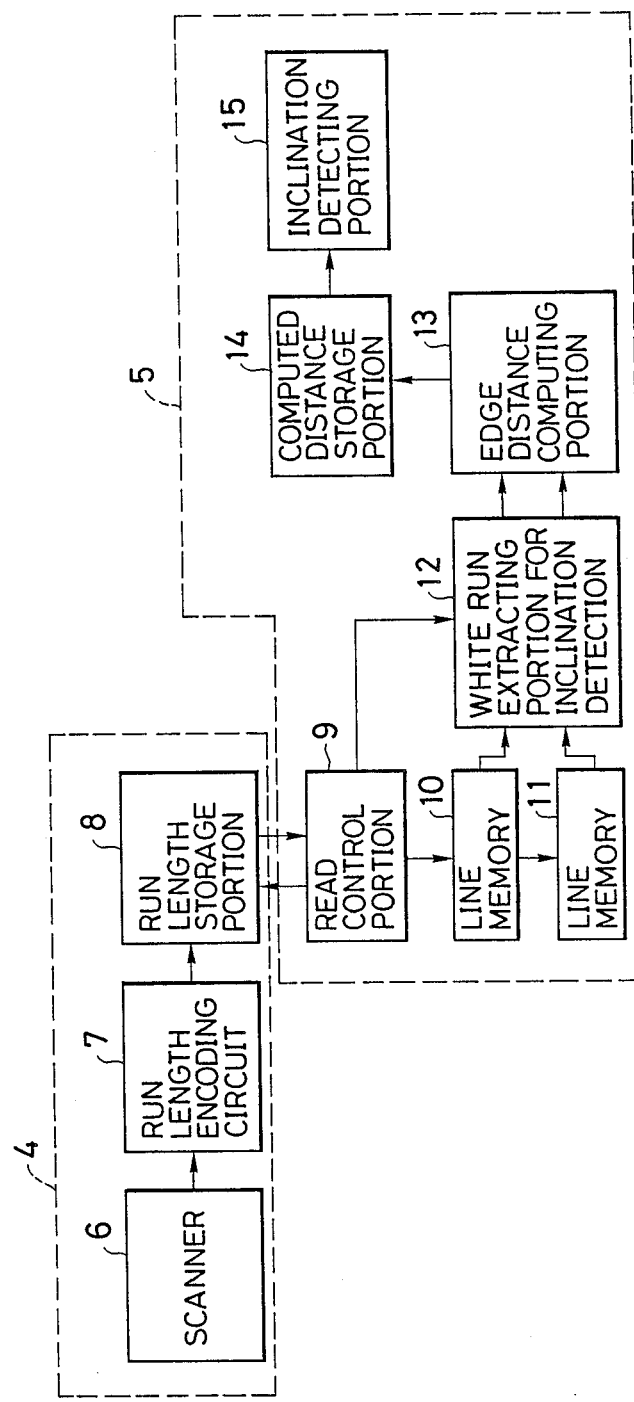
FIG. 3 is a block diagram showing an image inclination detecting apparatus according to a first embodiment of the present invention, in which the inclination of an image is detected according to run length codes provided by a reading and storing device such as a character recognition device or an image processor.

FIG. 3 is a block diagram showing the embodiment of the present invention. In the figure, a reading and storing portion 4 reads image data through a character recognition device or a computer graphics system and stores the data. A numeral 5 is a portion embodying the present invention.

A scanner 6 scans a document sheet and reads characters and graphics as binary image data.

A run length encoding circuit 7 receives the binary image data from the scanner 6 and encodes the image data with run length codes. Each of the codes comprises, as shown in FIG. 4, one flag bit that indicates whether pixels of a run are white or black, and 15 run length bits that indicate the number of the consecutive white or black pixels. Thus, the binary image data are remarkably compressed after the encoding.

A run length code storage portion 8 stores the run length codes from the run length encoding circuit 7.

A read control portion 9 sequentially reads the run length codes for each scanning line from the run length storage portion 8, and converts the codes into coordinates that indicate distances (the number of pixels) of the individual runs, each distance being counted from a start point of the scanning line to a trailing edge of the run in question. A coordinate of the trailing edge of a certain run is the sum of a length of the certain run and lengths of runs existing on the left side of the certain run. Therefore, by adding the run length of the certain run to a coordinate of the trailing edge of a run just before the certain run, a coordinate of the trailing edge of the certain run will be obtained. In this way, run length codes of respective runs are converted into trailing edge coordinates of the respective runs.

For example, run length codes of FIG. 5 (a) are converted by the read control portion 9 into edge coordinates of FIG. 5 (b).

The trailing edge coordinate of a run is considered to be the leading edge coordinate of the next run.

The edge coordinates from the read control portion 9 are written into a line memory 10. Before this writing operation is executed, edge coordinates existing in the line memory 10 are transferred to another line memory 11. Therefore, the line memories 10 and 11 store coordinates of adjacent two scanning lines.

A white run extracting portion 12 for inclination detection reads the edge coordinates from the line memories 10 and 11 in parallel, and prepares edge coordinates of the runs according to predetermined conditions.

In this embodiment, short white runs that may appear within characters and between adjacent characters are rejected, and only long white runs are selected. These long white runs extend between edges of the top or the bottom segments of characters. As shown in FIGS. 6 (a) and 6 (b), flags are set at leading edge coordinates or at trailing edge coordinates of white runs each longer than a predetermined length L.

At this time, the read control portion 9 sends sign information related to the runs of the two scanning lines to the white run extracting portion 12. The sign information is for indicating whether the runs represented with the edge coordinates change from white to black, or from black to white.

In converting the run length codes into the edge coordinates in the read control portion 9, sign bits may be left as they are. Then, it is not necessary to send the sign information from the read control portion 9 to the white run extracting portion 12.

Figure 7A:
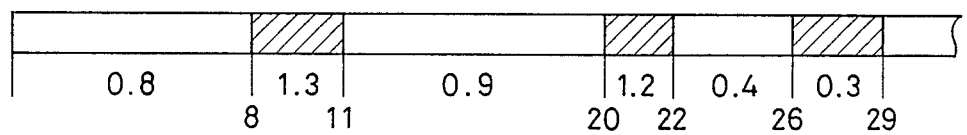
FIG. 7 (a) is a view showing runs on a scanning line.
Figure 7B:
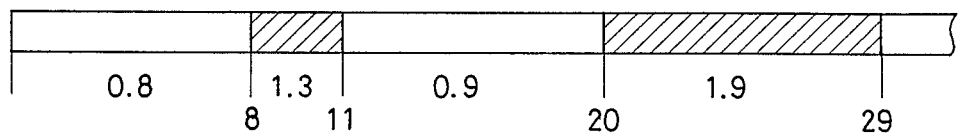

Instead of setting the flags at edge coordinates meeting the conditions of the white run extracting portion 12, the read control portion 9 may replace, when converting the run length codes into the edge coordinates, white runs shorter than the length L with black runs as shown in FIGS. 7a and 7b to leave only the edge coordinates of white runs longer than the length L.

Figure 8:
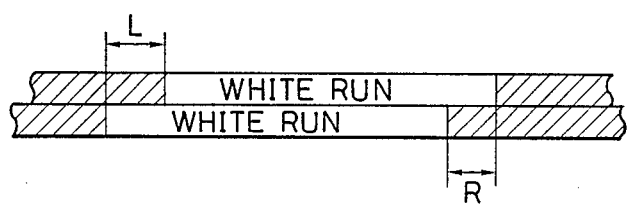
FIG. 8 is a view showing a distance between leading edges and a distance between trailing edges of white runs contacting to each other and located on adjacent scanning lines respectively.
Figure 9:
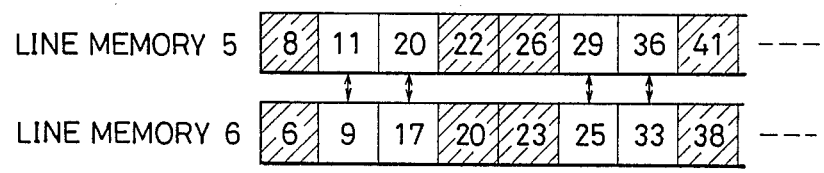
FIG. 9 is a view showing a method of computing, based on edge coordinates, distances between the leading edges and between the trailing edges of white runs contacting one another and located on adjacent scanning lines.

An edge distance computing portion 13 computes a distance R between trailing edges of white runs that are on adjacent two scanning lines respectively and contacting with each other, i.e., at least one edge of a white run on one scanning line contacts with somewhere between the leading and trailing edges of another white run on the other scanning line as shown in FIG. 8. The computation of the distance R is carried out as shown in FIG. 9. It is possible to compute a distance L between leading edges of the white runs, or both the distances R and L, as shown in FIG. 8.

Figure 10:
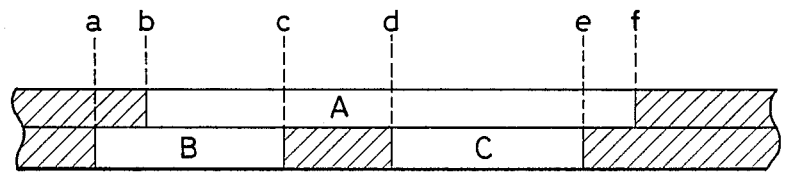
FIG. 10 is a view showing a white run which is located on one scanning line and contacting plural white runs on another scanning line.

If two or more white runs touch one white run on the other scanning line, as shown in FIG. 10, leading edge distances and trailing edge distances of all the white runs are calculated as follows to improve a processing speed:

leading edge distances=(b−a), (b−d)

trailing edge distances=(f−c), (f−e).

The leading edge distance (b−d) and the trailing edge distance (f−c) are not adequate for detecting the inclination. However, according to the above-mentioned processing method, the number of inadequate edge distances is extremely small compared to the number of adequate edge distances so that the inclination detection may not be hindered by the inadequate edge distances.

The edge distances computed in the edge distance computing portion 13 are stored in a computed distance storage portion 14.

An inclination detection portion 15 computes occurrence frequencies of the edge distances stored in the computed distance storage portion 14 to obtain a representative value M of the edge distances. Then, the inclination of the characters is computed as follows with the representative value M:

$$\theta = \tan^{-1}(1/M).$$

Figure 11:
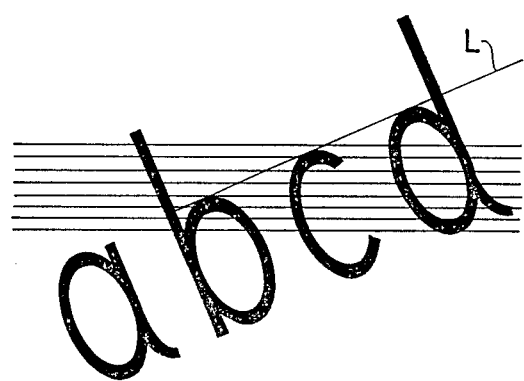
FIG. 11 is a view showing oblique characters with white runs on scanning lines.

In this embodiment, the short white runs are rejected, and only the long white runs are computed for their edge distances. Therefore, as shown in FIG. 11, most of the edge distances are edge distances of white runs starting from or ending at edges of vertical segments of characters as well as edge distances of white runs starting from or ending at edges of top or bottom segments of the characters.

If the inclination of characters with respect to a scanning direction is less than ±45°, edge distances of the white runs starting from or ending at edges of vertical segments of characters appear around zero in a distribution diagram of the edge distances, while edge distances of the white runs starting from or ending at edges of top or bottom segments of the characters appear around a position distant from zero in the distribution diagram. Namely, as shown in a histogram of FIG. 12 (a), two maximal values appear in the distribution of the edge distances.

In this embodiment, an edge distance corresponding to the maximal value distant from zero is selected as the representative value M to compute the inclination. Thus, the inclination of a line L of characters with respect to a scanning direction is obtained as shown in FIG. 11.

Instead of the edge distance corresponding to the maximal value distant from zero, an edge distance corresponding to the maximal value close to zero may be selected as the representative value M to compute the inclination.

Further, the representative value M may be selected as an average of one of the maximal values and peripheral values within a proper range around the one maximal value.

The representative value may be computed according to a proper method matching with the statistical nature of characters such as Japanese characters and alphabetic characters.

Figure 12A:
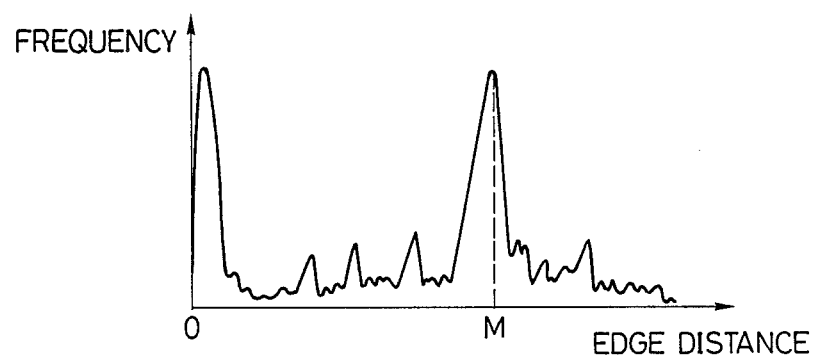
FIG. 12 (a) is a histogram of edge distances.
Figure 12B:
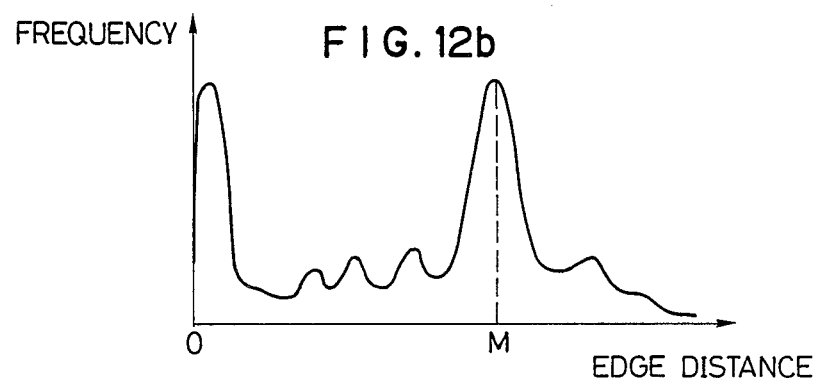

It is possible to compute the representative value M after properly processing the occurrence frequencies of the edge distances. For example, as shown in FIG. 12 (b), the distribution of the edge distances may be smoothed with a Gaussian operator to suppress small changes in the distribution and enhance relations between the occurrence frequencies of the edge distances and the inclination of characters.

In this embodiment, short white runs have been rejected, and only the edge distances of long white runs have been computed. However, other proper conditions such as the kinds and characteristics of characters and graphics may be employed in selecting runs whose edge distances are to be computed.

According to the image inclination detecting method of the present invention, an inclination of characters can be detected without putting inclination detection marks on a document. However, as shown in FIG. 13 (a), a thick line, etc., may be put on the document in parallel with a line of characters to improve a detection accuracy of the inclination.

Figure 13A:
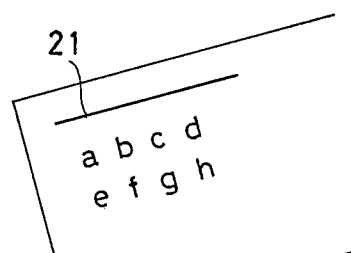
FIGS. 13 (a) and 13 (b) are views showing a mark line and rules depicted on document sheets respectively, to improve a detecting accuracy of inclination.
Figure 13B:
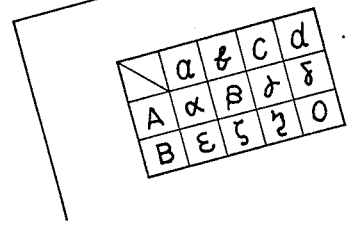

As shown in FIG. 13 (b), if there are straight lines such as rules of a table or underlines on the document, the inclination will correctly be detected without putting the reference lines or marks on the document.

The image inclination detecting method of the present invention is applicable not only for detecting the inclination of characters but also for detecting and correcting the inclination of graphics in a character recognition apparatus or a computer graphics system.

The preferred embodiment described herein is only illustrative and not restrictive of the scope of the present invention.

What is claimed is:

1. An image inclination detecting method for detecting the inclination of an image with respect to the scanning direction of an optical reader, according to image data of characters or graphics encoded as run length codes, each run length code representing the number of consecutive white or black pixels and a flag indicating whether the pixels are black or white, comprising the steps of:

computing edge distances between leading edges or between trailing edges of runs located on adjacent two scanning lines, respectively;

obtaining a representative value of the edge distances by statistically processing occurrence frequencies of the edge distances; and computing the inclination of the characters or graphics according to a relation between the representative value and a distance between the scanning lines.

2. The image inclination detecting method as claimed in claim 1, further comprising the step of:

converting the run length codes of the image data read by the respective scans into edge coordinates of the runs, the edge coordinate of each run representing a distance from a start point of a scanning line in which the run is included to a trailing edge of the run.

3. The image inclination detecting method as claimed in claim 2, wherein said step of computing the leading edge distances or the trailing edge distances of the runs on the adjacent scanning lines is carried out, with respect to one run on one of the adjacent scanning lines, the other run being on the other of the adjacent scanning lines and having at least one edge contacting the one run somewhere between the leading and trailing edges of the one run on the one scanning line.

4. The image inclination detecting method as claimed in claim 3, wherein the leading edge distances or the trailing edge distances are computed only for white runs longer than a predetermined length.

5. The image inclination detecting method as claimed in claim 4, wherein the representative value of the edge distances is an edge distance corresponding to a value about which the edge distances occur at a maximal frequency.

6. The image inclination detecting method as claimed in claim 4, wherein the representative value of the edge distances is an edge distance corresponding to a maximal value close to zero among two large maximal values in a distribution of the occurrence frequencies of the edge distances.

7. The image inclination detecting method as claimed in claim 4, wherein the representative value of the edge distances is an average value of a maximal value distant from zero among two large maximal values in a distribution of the occurrence frequencies of the edge distances and peripheral values around the maximal value distant from zero.

8. The image inclination detecting method as claimed in claim 4, wherein the representative value of the edge distances is an average value of a maximal value close to zero among two large maximal values in a distribution of the occurrence frequencies of the edge distances and peripheral values around the maximal value close to zero.

9. An image inclination detecting apparatus for detecting an inclination of the image according to run length codes converted from image data, comprising:

read control means for sequentially reading the run length codes for one scanning line from an image data storage means, and converting the run length codes into edge coordinates, the edge coordinate of each run representing a distance from a start point of the scanning line to a trailing edge of the run;

a first storage portion for storing the edge coordinates from said read control means;

a second storage portion for storing the edge coordinates from said first storage portion;

selecting means for reading the edge coordinates from said first and second storage portions in parallel, and selecting the edge coordinates of runs meeting the predetermined conditions;

edge distance computing means for computing, according to the edge coordinates of the runs selected by said selecting means, distances between the leading edges or between the trailing edges of runs having predetermined positional relations and located on two adjacent scanning lines respectively;

a storage portion for storing computed results from said edge distance computing means; and an inclination computing portion for computing the inclination of the image with respect to a scanning direction of a reading device according to occurrence frequencies of the computed edge distances.

10. The image inclination detecting apparatus as claimed in claim 9, wherein the run length codes of the image data read by the respective scans are converted into edge coordinates of the runs, the edge coordinate of each run representing a distance from the start point of a scanning line in which the run is included to a trailing edge of the run.

11. The image inclination detecting apparatus as claimed in claim 10, wherein the computation of the leading edge distances or the trailing edge distances of the runs on the adjacent scanning lines is carried out, with respect to one run on one of the adjacent scanning lines, for runs each being on the other of the adjacent scanning lines and having at least one edge contacting with somewhere between the leading and trailing edges of the one run on the one scanning line.

12. The image inclination detecting apparatus as claimed in claim 11, wherein the leading edge distances or the trailing edge distances are computed only for white runs longer than a predetermined length.

13. The image inclination detecting apparatus as claimed in claim 12, wherein the representative value of the edge distances is an edge distance corresponding to a maximal value distant from zero among two large maximal values in a distribution of the occurrence frequencies of the edge distances.

14. The image inclination detecting apparatus as claimed in claim 12, wherein the representative value of the edge distances is an edge distance corresponding to a maximal value close to zero among two large maximal values in a distribution of the occurrence frequencies of the edge distances.

15. The image inclination detecting apparatus as claimed in claim 12, wherein the representative value of the edge distances is an average value of a maximal value distant from zero among two large maximal values in a distribution of the occurrence frequencies of the edge distances and peripheral values around the maximal value distant from zero.

16. The image inclination detecting apparatus as claimed in claim 12, wherein the representative value of the edge distances is an average value of a maximal value close to zero among two large maximal values in a distribution of the occurrence frequencies of the edge distances and peripheral values around the maximal value close to zero.

17. An image inclination detecting apparatus for detecting an inclination of an image according to run length codes converted from image data, comprising:

run length encoding means for encoding input image data with the run length codes;

distance detecting means for comparing the run length codes relating to image data of adjacent two lines with one another and detecting distances between inverting portions of the two lines, at each inverting portion a black run changes to a white run, and a white run changes to a black run; and inclination detecting means for finding a representative value according to a distribution of the distances between the inverting portions obtained by said distance detecting means, and detecting the inclination of the input image according to the representative value.

18. An image inclination detecting method, comprising the steps of:

scanning an image in order to obtain a sequence of blank lengths with intervals therebetween along each scanning line;

measuring the edge distances either between the trailing or leading edges of blank lengths in adjacent scanning lines and any overlaps with respect to the scanning direction;

determining a representative value of the edge distances about which value the edge distances occur at a maximal frequency; and calculating the inclined angle by obtaining the arc tangent of said representative value or the inverse thereof.

19. The method of claim 18 wherein, if a short blank length less than a predetermined length is scanned, said short blank length is incorporated in an interval.

20. An image inclination detecting method comprising the steps of:

scanning an image in order to obtain, along each scanning line, a sequence of white and black pixel trains, each of which consists of one or a plurality of consecutive similar pixels;

measuring the edge distances between trailing or leading edges of the white pixel trains which belong to adjacent scanning lines and any overlaps with respect to the scanning direction;

determining the representative value of the edge distances about which value the edge distances occur at a maximal frequency; and calculating the inclined angle by obtaining the arc tangent of the inverse of said representative value.

* * * * *